United States Patent
Kuo

(10) Patent No.: US 9,946,600 B2
(45) Date of Patent: Apr. 17, 2018

(54) METHOD OF DETECTING POWER RESET OF A SERVER, A BASEBOARD MANAGEMENT CONTROLLER, AND A SERVER

(71) Applicant: MITAC COMPUTING TECHNOLOGY CORPORATION, Hsinchu (TW)

(72) Inventor: Ming-I Kuo, Hsinchu (TW)

(73) Assignee: Mitac Computing Technology Corporation, Hsinchu (TW)

( * ) Notice: Subject to any disclaimer, the term of this patent is extended or adjusted under 35 U.S.C. 154(b) by 149 days.

(21) Appl. No.: 15/014,073

(22) Filed: Feb. 3, 2016

(65) Prior Publication Data
US 2017/0220419 A1    Aug. 3, 2017

(51) Int. Cl.
G06F 11/14    (2006.01)
G06F 11/07    (2006.01)

(52) U.S. Cl.
CPC ...... *G06F 11/1417* (2013.01); *G06F 11/0721* (2013.01); *G06F 11/0757* (2013.01); *G06F 2201/805* (2013.01); *G06F 2201/85* (2013.01)

(58) Field of Classification Search
CPC ............................ G06F 11/14; G06F 11/1417
USPC .......................................................... 714/15
See application file for complete search history.

(56) References Cited

U.S. PATENT DOCUMENTS

| | | | | |
|---|---|---|---|---|
| 5,604,755 A * | 2/1997 | Bertin | ................. | G06F 11/073 714/764 |
| 8,261,133 B1 * | 9/2012 | Ali-Santosa | ........ | G06F 11/1004 713/1 |
| 2004/0250178 A1 * | 12/2004 | Munguia | ............. | G06F 11/0757 714/55 |
| 2006/0184536 A1 * | 8/2006 | Jreij | ...................... | H04L 45/245 |
| 2007/0169088 A1 * | 7/2007 | Lambert | ............. | G06F 11/0709 717/168 |
| 2008/0010563 A1 * | 1/2008 | Nishimura | ............ | G06F 9/4812 714/55 |
| 2008/0162984 A1 * | 7/2008 | Kalra | .................. | H04L 41/0213 714/4.11 |
| 2009/0113194 A1 * | 4/2009 | Orita | .................. | G06F 11/1417 713/1 |
| 2012/0124186 A1 * | 5/2012 | Emerson | ............... | H04L 41/022 709/223 |
| 2012/0275610 A1 * | 11/2012 | Lambert | ................. | G10L 25/48 381/56 |
| 2014/0143574 A1 * | 5/2014 | Ma | ........................ | G06F 1/3234 713/323 |

(Continued)

Primary Examiner — Kamini B Patel
(74) Attorney, Agent, or Firm — Michael Best & Friedrich LLP

(57) ABSTRACT

A method of detecting power reset of a server includes: after receiving an event signal, determining whether or not to initialize a random access memory (RAM) of a baseboard management controller (BMC) of the server based on the event signal thus received, and initializing the RAM when it is determined to initialize the same; determining whether a protocol error event has occurred according to a flag value of a power reset flag stored in the RAM; determining whether malfunction of a processor unit of the BMC has occurred when it is determined that the protocol error event has not occurred; and determining that a power reset event has occurred when it is determined that malfunction of the processor unit has not occurred.

20 Claims, 6 Drawing Sheets

(56) References Cited

U.S. PATENT DOCUMENTS

2016/0197809 A1* 7/2016 Young ................. H04L 41/5016
709/224
2016/0253233 A1* 9/2016 Curtis ................. G06F 11/0757
714/55

* cited by examiner

METHOD OF DETECTING POWER RESET OF A SERVER, A BASEBOARD MANAGEMENT CONTROLLER, AND A SERVER

FIELD

The disclosure relates to a method of detection, more particularly to a method of detecting power reset, and a baseboard management controller and a server for implementing the method.

BACKGROUND

Currently, a server receives alternative current (AC) power provided externally for maintaining its normal operation. When the AC power is interrupted for some reason, for example, power supply source is unstable, or, a power plug of the server is unplugged accidentally to result in power interruption, operation of the server is adversely affected, and the power interruption may even lead to a system shutdown or service interruption.

A conventional approach for detecting server reset due to power interruption is to utilize an advanced power supply with a function of detecting AC power interruption for providing power required by the server. A baseboard management controller which manages and controls operational status of the server is also adopted to obtain from the power supply a signal that indicates a power reset event. However, the conventional approach additionally requires the advanced power supply with the function of detecting AC power interruption, which increase costs. Besides, this advanced power supply may incur system compatibility issues.

SUMMARY

Therefore, an object of the disclosure is to provide a method of detecting power reset of a server, and a baseboard management controller and a server implementing the method.

According to a first aspect of the disclosure, the method is adapted to detect power reset of a server. The server includes a baseboard management controller which includes a random access memory and a processor unit coupled electrically to the random access memory. The random access memory stores a power reset flag. The method is to be implemented by the server and includes following steps:

after receiving an event signal, by the processor unit, determining whether or not to initialize the random access memory based on the event signal thus received, and initializing the random access memory when it is determined to initialize the same;

determining, by the processor unit, whether a protocol error event has occurred according to a flag value of the power reset flag stored in the random access memory;

determining, by the processor unit, whether malfunction of the processor unit has occurred when it is determined that the protocol error event has not occurred; and determining, by the processor unit, that a power reset event has occurred when it is determined that malfunction of the processor unit has not occurred.

According to a second aspect of the disclosure, the baseboard management controller includes a random access memory storing a power reset flag, and a processor unit coupled electrically to the random access memory. The processor unit is programmed to after receiving an event signal, determine whether or not to initialize the random access memory based on the event signal thus received, and initialize the random access memory when it is determined to initialize the same, determine whether a protocol error event has occurred according to a flag value of the power reset flag stored in the random access memory, determine whether malfunction of the processor unit has occurred when it is determined that the protocol error event has not occurred, and determine that a power reset event has occurred when it is determined that malfunction of the processor unit has not occurred.

According to a third aspect of the disclosure, the server includes an intelligent platform management interface (IPMI) which generates a reset request signal in response to receipt of a reset command, and a baseboard management controller which includes a random access memory, a processor unit and an electronically erasable programmable read-only memory (EEPROM). The random access memory stores a power reset flag. The processor unit is coupled electrically to the random access memory. The electronically erasable programmable read-only memory (EEPROM) is coupled electrically to the processor unit. The processor unit is programmed to after receiving an event signal, determine whether or not to initialize the random access memory based on the event signal thus received, and initialize the random access memory when it is determined to initialize the same, determine whether data stored at a predetermined address of said EEPROM conforms to a specific value, determine whether a protocol error event has occurred according to a flag value of the power reset flag stored in said random access memory when it is determined that the data stored at the predetermined address of said EEPROM does not conform to a specific value, determine whether malfunction of said processor unit has occurred when it is determined that the protocol error event has not occurred, and determine that a power reset event has occurred when it is determined that malfunction of said processor unit has not occurred.

An effect of this disclosure resides in that the server is capable of directly detecting the power reset event without the need to purchase an advanced power supply, so as to prevent system compatibility issues.

BRIEF DESCRIPTION OF THE DRAWINGS

Other features and advantages of the disclosure will become apparent in the following detailed description of embodiments with reference to the accompanying drawings, of which.

DETAILED DESCRIPTION

Figure 1:
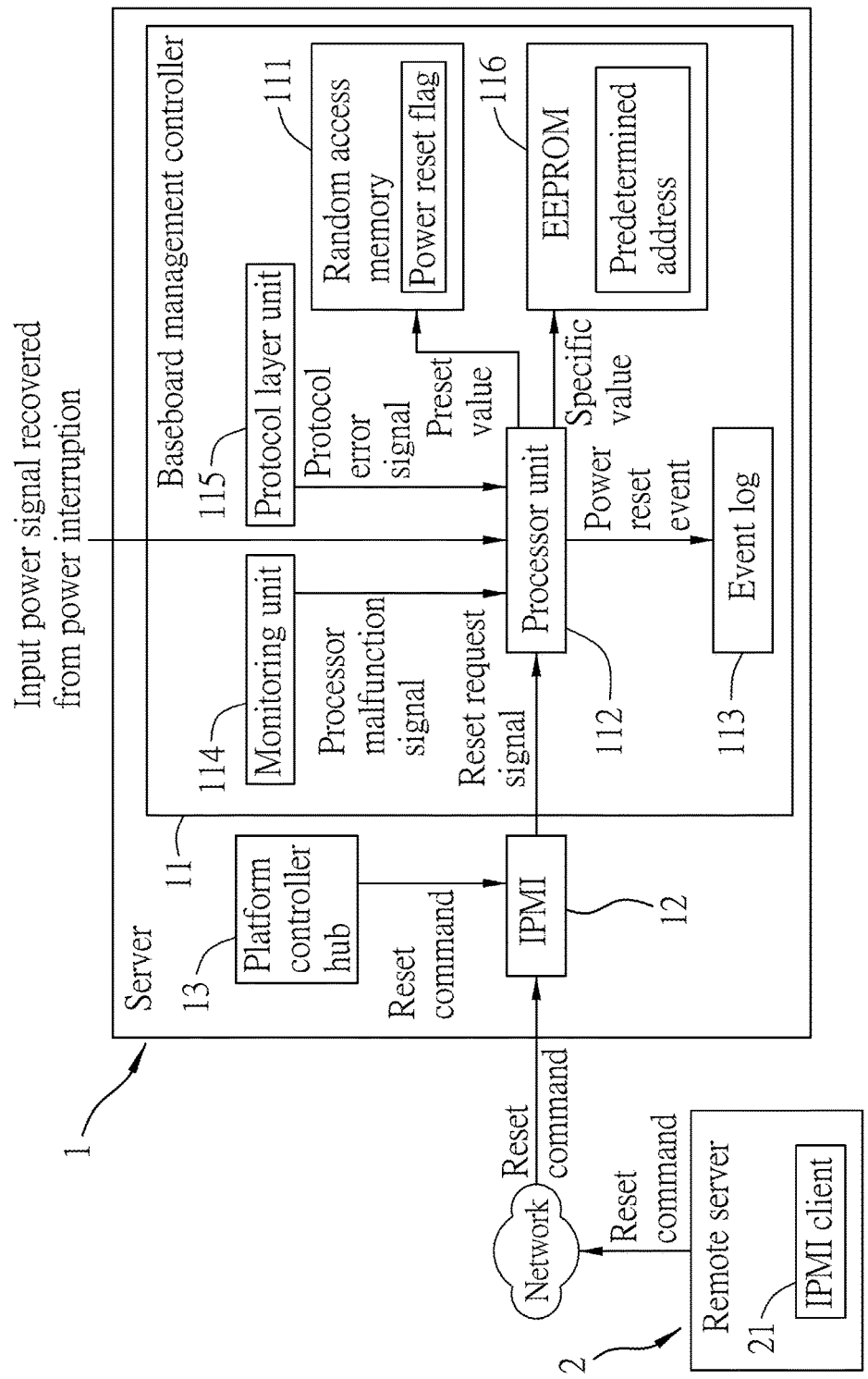
FIG. 1 is block diagram illustrating an embodiment of a server according to the disclosure.

Before this disclosure is described in greater detail with reference to the accompanying embodiments, it should be noted herein that like elements are denoted by the same reference numerals throughout the disclosure.

Referring to FIG. 1, an embodiment of a server 1 of this disclosure includes a baseboard management controller (BMC) 11, a platform controller hub (PCH) 13 and an intelligent platform management interface (IPMI) 12. In this embodiment, the platform controller hub 13 is exemplified as a southbridge.

The IPMI 12 determines whether or not to generate a reset request signal according to a reset command. Specifically, the IPMI 12 generates the reset request signal in response to receipt of the reset command. The reset command is issued from an IPMI client 21 of a remote server 2 via a network when a cold reset, a warm reset or firmware update is requested at a remote end. Alternatively, the reset command may be issued from the platform controller hub 13 of the server 1 when a cold reset, a warm reset or firmware update is requested at a local end.

The baseboard management controller 11 includes a random access memory (RAM) 111 storing a power reset flag, a processor unit 112 coupled electrically to the random access memory 111, an event log 113 coupled electrically to the processor unit 112 and recording a power reset event, a monitoring unit 114 coupled electrically to the processor unit 112 and monitoring operations of the processor unit 112, a protocol layer unit 115 coupled electrically to the processor unit 112 and providing software stack structures for an operating system run by the processor unit 12, and an electronically erasable programmable read-only memory (EEPROM) 116 coupled electrically to the processor unit 112. In this embodiment, the monitoring unit 114 is exemplified as a watchdog timer, the protocol layer unit 115 is exemplified as an IPMI stack, and the EEPROM 116 is exemplified as a dynamic random access memory (DRAM).

Figure 2A:
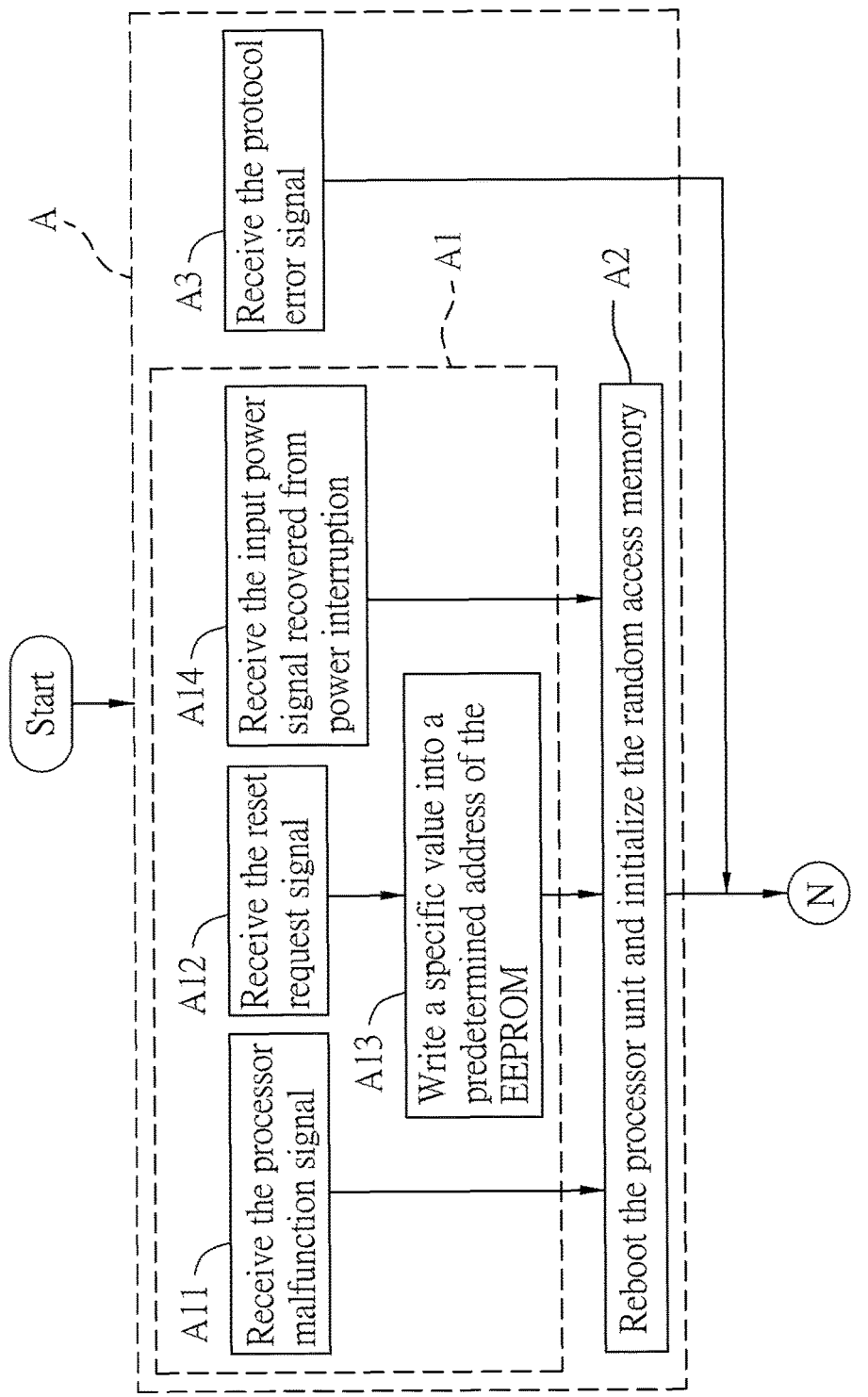
FIGS. 2A and 2B cooperate to illustrate a flow chart of a first embodiment of a method of detecting power reset of a server according to the disclosure.
Figure 2B:
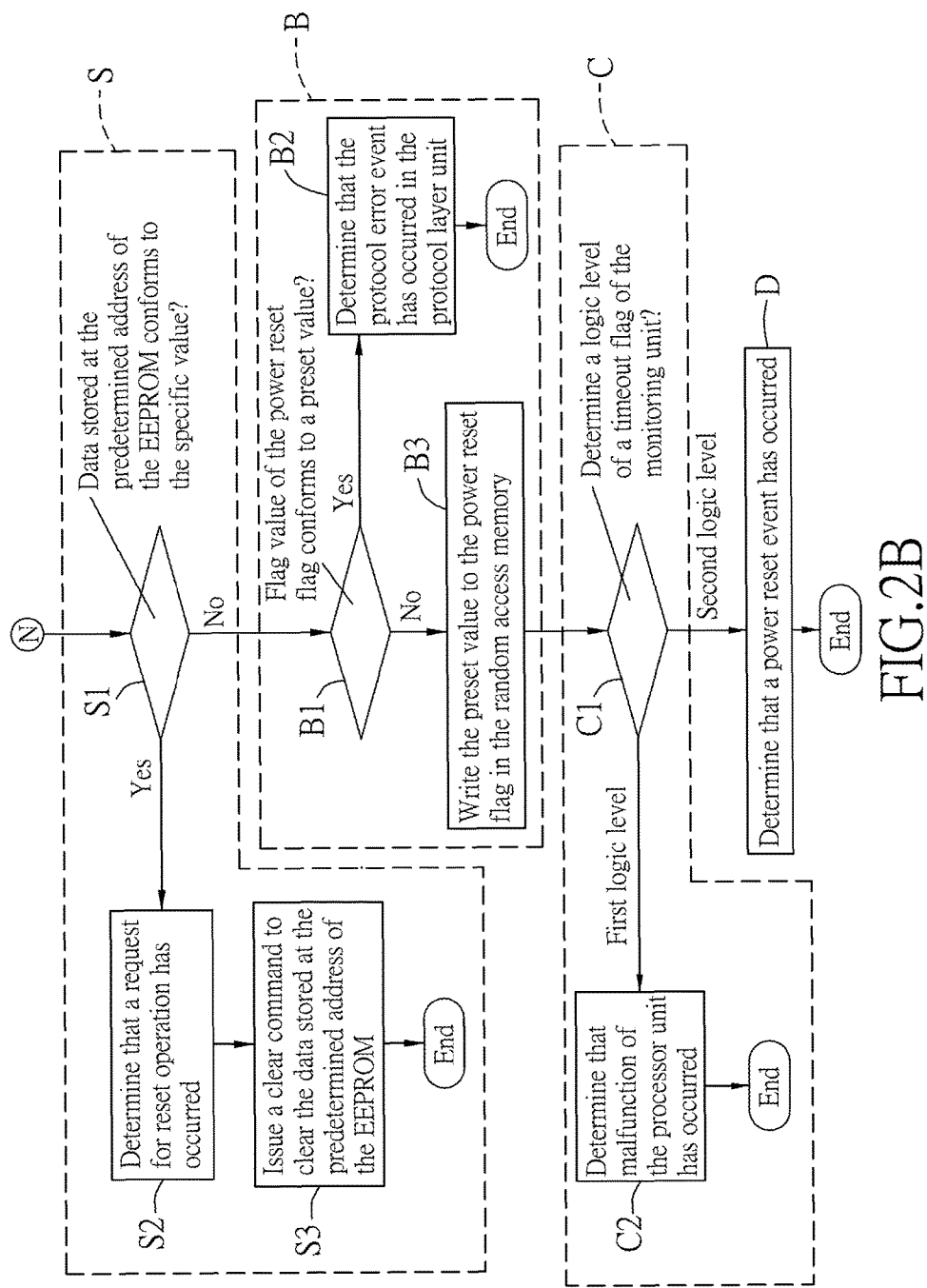

Referring to FIGS. 2A and 2B, a first embodiment of a method of detecting power reset of a server according to the disclosure is illustrated. The method is to be implemented by the server 1 (see FIG. 1) and the processor unit 112 (see FIG. 1) is programmed to perform the following steps of the method.

In step A of FIG. 2A, the processor unit 112, after receiving an event signal, determines whether or not to initialize the random access memory 111 based on the event signal thus received, and initializes the random access memory 111 when it is determined to initialize the same. The flow proceeds to step S. The event signal is one of an input power signal recovered from power interruption and provided to the server 1, a processor malfunction signal issued from the monitoring unit 114 and indicating malfunction of the processor unit 112, a reset request signal issued from the IPMI 12, and a protocol error signal issued from the protocol layer unit 115. Step A includes the following steps A1, A2 and A3.

In step A1, the processor unit 112 receives one of the processor malfunction signal, the reset request signal and the input power signal recovered from power interruption, and the flow proceeds to step A2. Specifically, step A1 includes the following sub-steps A11, A12, A13 and A14.

In sub-step A11, the processor unit 112 receives the processor malfunction signal.

In sub-step A12, the processor unit 112 receives the reset request signal, and the flow proceeds to sub-step A13.

In sub-step A13, the processor unit 112 writes a specific value into a predetermined address of the EEPROM 116.

In sub-step A14, the processor unit 112 receives the input power signal recovered from power interruption.

In step A2, the processor unit 112 reboots itself and initializes the random access memory 111.

In step A3, the processor unit 112 receives the protocol error signal, and determines not to reboot the processor unit 112 and not to initialize the random access memory 111.

It should be noted that the aforementioned event signals (i.e., the processor malfunction signal, the reset request signal, the input power signal recovered from power interruption and the protocol error signal) correspond respectively to occurrences of the following events. First, the processor unit 112 is reset by the monitoring unit 114 due to malfunction of the processor unit 112 itself (e.g., hardware fail or program error of the processor unit 112). Second, by receiving the reset command issued from the IPMI client 21 of the remote server 2 or issued from the platform controller hub 13, the processor unit 112, in response to a request for reset operation, performs the reset operation, such as a cold reset, a warm reset, or a firmware update reset according to the reset command. Third, the alternative current (AC) power supplied to the server 1 is interrupted and later recovered so that the processor unit 112 is reset (i.e., power reset). Fourth, there are protocol errors occurring in the protocol layer unit 115 to result in reset of the protocol layer unit 115. Accordingly, based on occurrences of the different events, the processor unit 112, according to the event signal thus received, determines whether to proceed to subsequent determination steps directly or to proceed to step A2 first and then proceed to the subsequent determination steps.

Referring to FIG. 2B, the processor unit 112 is required to distinguish which signal type the event signal thus received belongs to. Therefore, in step S, the processor unit 112 determines whether a request for reset operation has occurred according to data stored at the predetermined address of the EEPROM 116. Step S includes the following sub-steps S1, S2 and S3.

In sub-step S1, the processor unit 112 determines whether the data stored at the predetermined address of the EEPROM 116 conforms to the specific value. When it is determined by the processor unit 112 that the data stored at the predetermined address of the EEPROM 116 does not conform to the specific value, step B is performed.

In sub-step S2, the processor unit 112 determines that a request for reset operation has occurred when it is determined in sub-step S1 that the data stored at the predetermined address of the EEPROM 116 conforms to the specific value.

In sub-step S3, the processor unit 112 issues a clear command to clear the data stored at the predetermined address of the EEPROM 116, and the process terminates.

It should be noted that, in consideration of electronic characteristics of the EEPROM 116, the processor unit 112, when receiving the reset request signal, writes the specific value into the predetermined address of the EEPROM 116 and reboots the processor unit 112. However, reboot of the processor unit 112 does not cause the specific value stored at the predetermined address of the EEPROM 116 to be modified. In this way, when the data stored at the predetermined address of the EEPROM 116 conforms to the specific value, it can be determined that the request for reset operation has occurred, and the data stored at the predetermined address should be cleared so as to allow rewrite of the specific value when the processor unit 112 receives the reset request signal once again.

In step B, the processor unit 112 determines whether a protocol error event has occurred according to a flag value of the power reset flag stored in the random access memory 111. Step B includes sub-steps B1, B2 and B3.

In sub-step B1, the processor unit 112 determines whether the flag value of the power reset flag conforms to a preset value.

In sub-step B2, the processor unit 112 determines that the protocol error event has occurred in the protocol layer unit 115 when it is determined in sub-step B1 that the flag value of the power reset flag conforms to the preset value, and the process terminates.

In sub-step B3, the processor unit 112 writes the preset value to the power reset flag stored in the random access memory 111 for updating the flag value of the power reset flag when it is determined in sub-step B1 that the flag value of the power reset flag does not conform to the preset value. The flow proceeds to step C after sub-step B3.

It should be noted that, in consideration of the electronic characteristics of the random access memory 111, when the processor unit 112 reboots itself and initializes the random access memory 111, the flag value of the power reset flag stored in the random access memory 111 is cleared. However, since the processor unit 112 does not initialize the random access memory 111 in response to receipt of the protocol error signal, it may be determined that the protocol error event has occurred when the flag value of the power reset flag conforms to the preset value. In this case, the preset value of the power reset flag may be set owing to previous receipt of one of the processor malfunction signal, the reset request signal and the input power signal recovered from power interruption.

In step C, the processor unit 112 determines whether malfunction of the processor unit 112 has occurred. Step C includes sub-steps C1 and C2.

In sub-step C1, the processor unit 112 determines a logic level of a timeout flag of the monitoring unit 114.

In sub-step C2, the processor unit 112 determines that malfunction of the processor unit 112 has occurred when it is determined in sub-step C1 that the timeout flag is at a first logic level. Otherwise, i.e., when it is determined in sub-step C1 that the timeout flag is at a second logic level, the processor unit 112 determines that malfunction of the processor unit 112 has not occurred, and the flow proceeds to step D.

In step D, the processor unit 112 determines that a power reset event has occurred, and records the power reset event into the event log 113.

It is evident from above that, in this embodiment, the processor unit 112 determines in sequence to first exclude the occurrence of a request for reset operation in step S, to next exclude the occurrence of a protocol error event in step B, and to finally exclude the occurrence of malfunction of the processor unit 112 in step C, so as to subsequently determine that the server 1 has undergone power reset, and to record the power reset event into the event log 113.

Figure 3A:
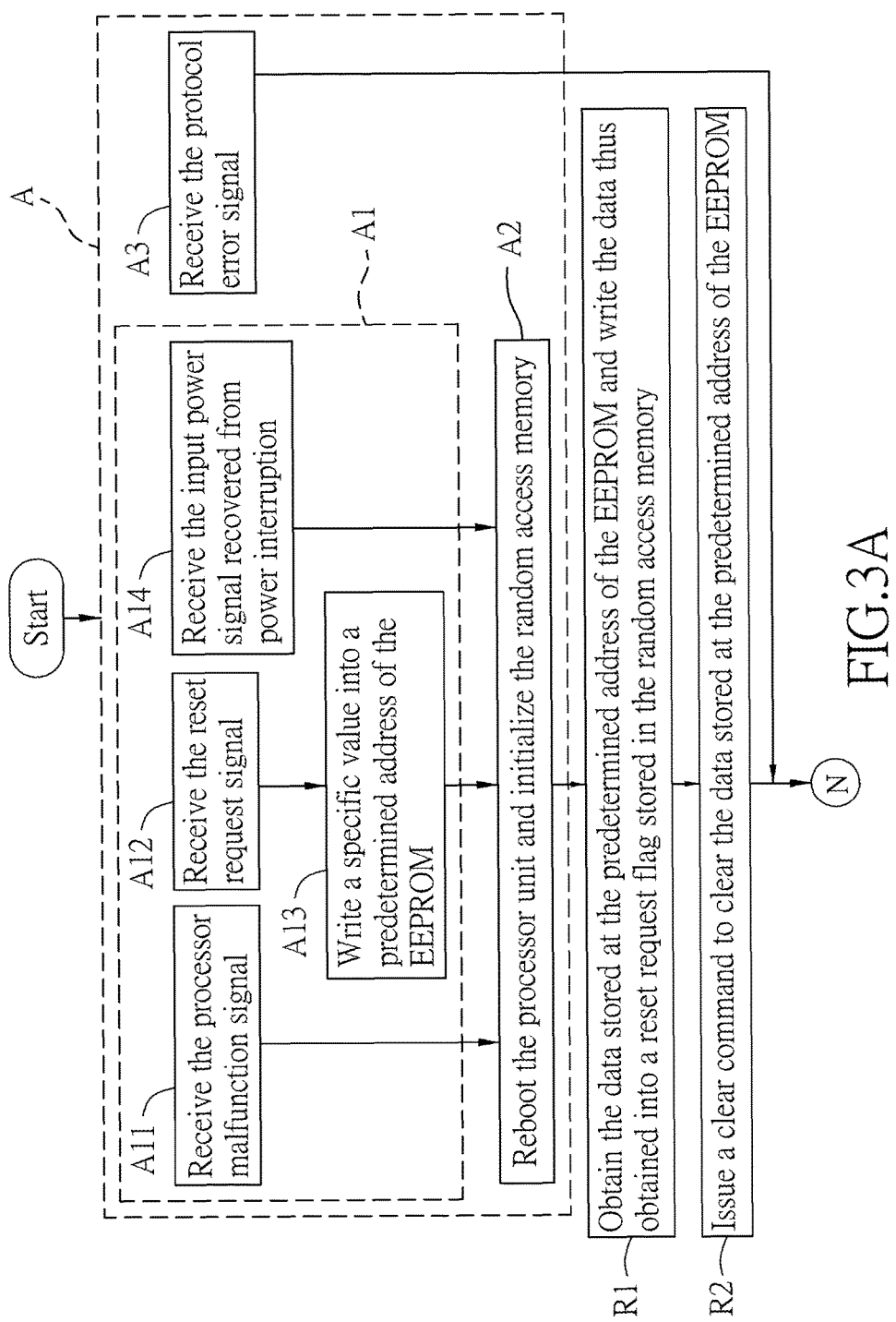
FIGS. 3A and 3B cooperate to illustrate a flow chart of a second embodiment of the method of detecting power reset of a server according to the disclosure.
Figure 3B:
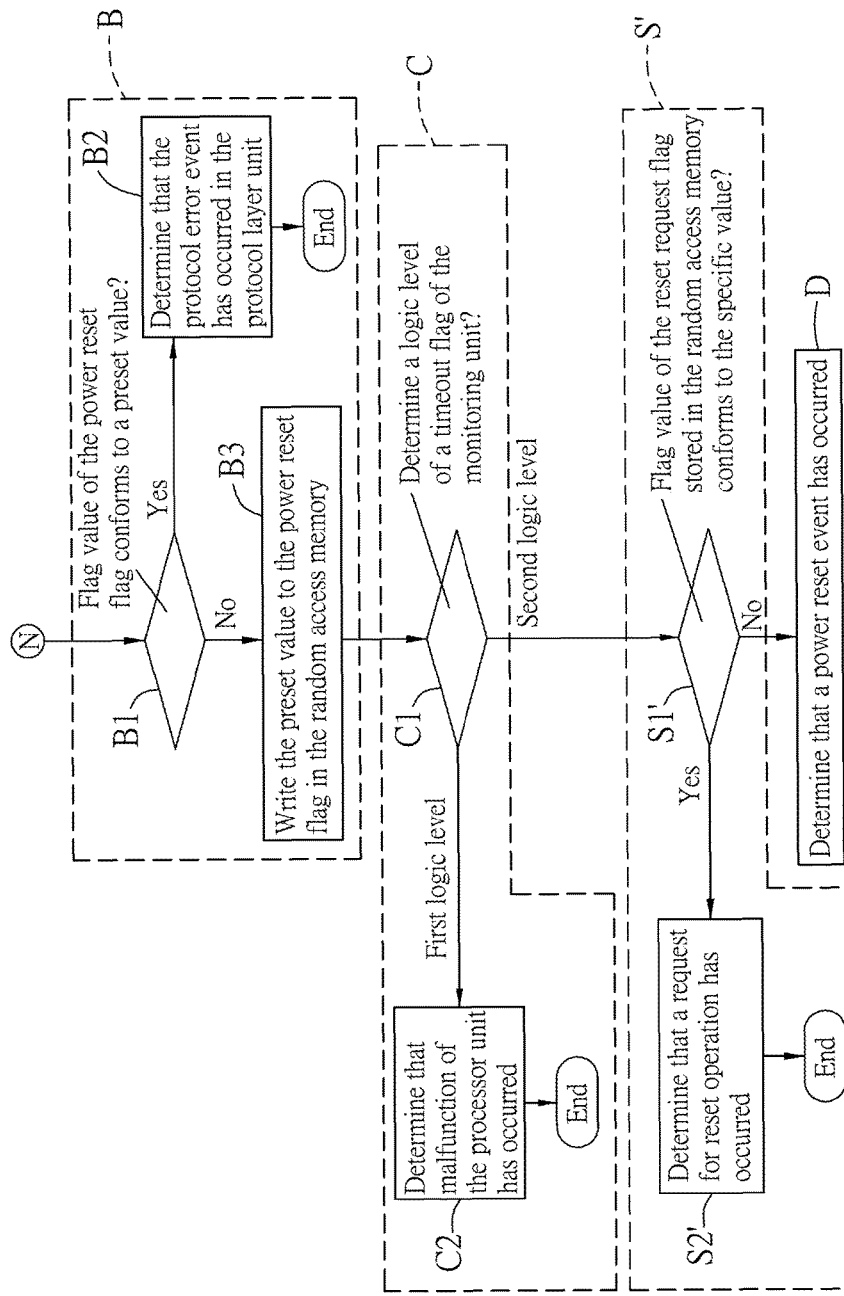

Referring to FIGS. 3A and 3B, a second embodiment of the method of detecting power reset of a server according to the disclosure is illustrated. The second embodiment is similar to the first embodiment, and differences therebetween reside in new steps R1 and R2 which are performed subsequent to step A2 and prior to step B, and in step S' which is performed subsequent to step C and prior to step D.

In step R1, the processor unit 112 (see FIG. 1) obtains the data stored at the predetermined address of the EEPROM 116 (see FIG. 1) and writes the data thus obtained into a reset request flag stored in the random access memory 111 (see FIG. 1).

In step R2, the processor unit 112 issues a clear command to clear the data stored at the predetermined address of the EEPROM 116.

In step S', the processor unit 112 determines whether a request for reset operation has occurred according to a flag value of the reset request flag stored in the random access memory 111. Step S' includes the following sub-steps S1' and S2'.

In sub-step S1', the processor unit 112 determines whether the flag value of the reset request flag stored in the random access memory 111 conforms to the specific value when it is determined in sub-step C1 that the timeout flag is at the second logic level.

In sub-step S2', the processor unit 112 determines that a request for reset operation has occurred when it is determined in sub-step S1' that the flag value of the reset request flag conforms to the specific value. Otherwise, the flow proceeds to step D.

In this way, a scenario in the first embodiment may be prevented that the processor unit 112 is not able to detect the occurrence of the power reset event when a power reset event has occurred immediately prior to clearing the data stored at the predetermined address of the EEPROM 116 in sub-step S3 because the data stored at the predetermined address of the EEPROM 116 is not modified even if the server 1 has undergone power reset. Accordingly, in the second embodiment, by writing the data obtained from the predetermined address of the EEPROM 116 into the reset request flag in the random access memory 111 in step R1, and by determining whether the flag value of the reset request flag stored in the random access memory 111 is erased due to power reset of the server 1, the processor unit 112 is able to determine whether a power reset event has occurred even if the power reset event has occurred immediately prior to step R2.

Figure 4:
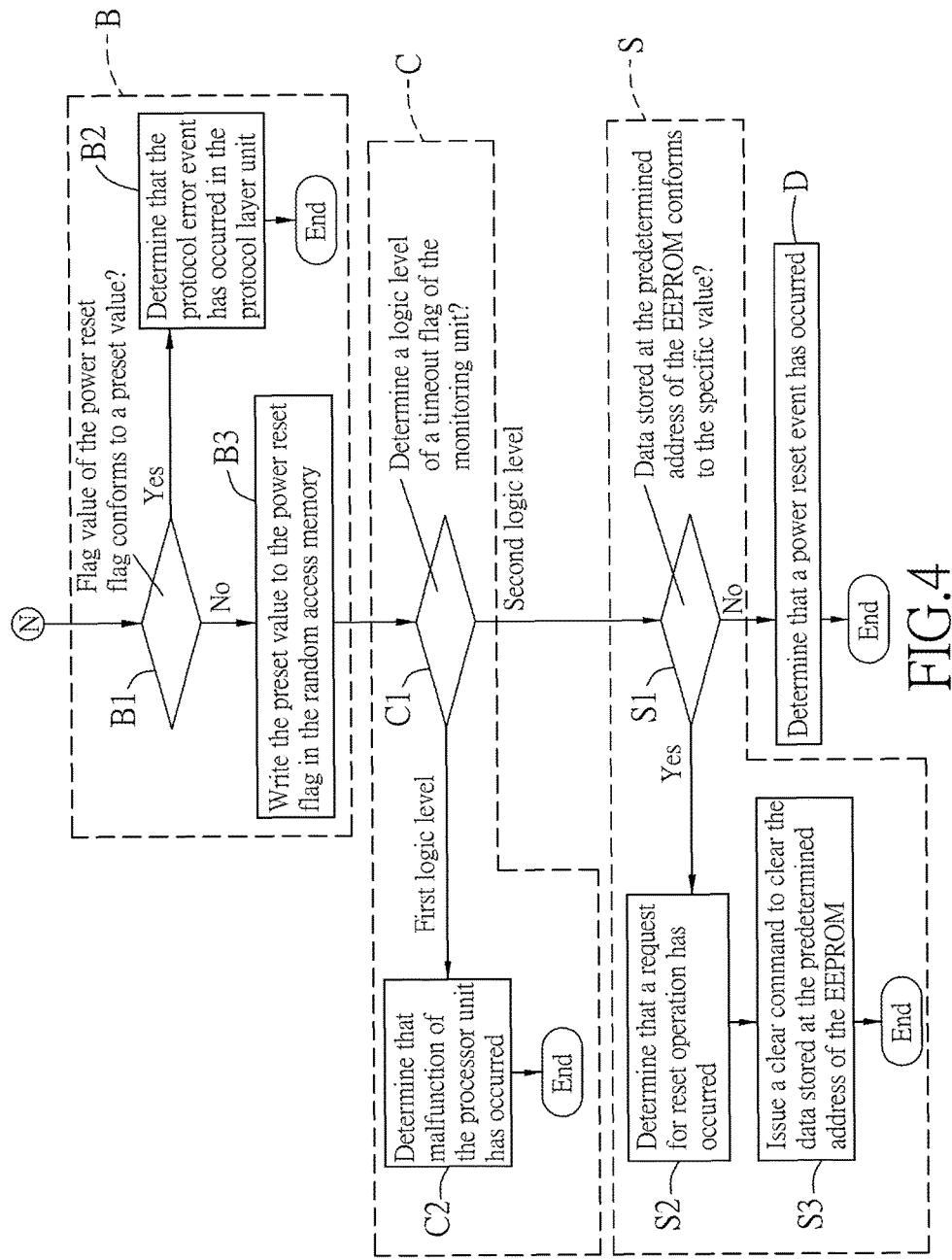
FIG. 4 cooperates with FIG. 2A to illustrate a flow chart of a third embodiment of the method of detecting power reset of a server according to the disclosure.

Referring to FIGS. 2A and 4, a third embodiment of the method of detecting power reset of a server according to the disclosure is illustrated. The third embodiment is similar to the first embodiment, and differences therebetween reside in the execution sequence of step S which is performed subsequent to step C and prior to step D in the third embodiment.

In sub-step S1, the processor unit 112 (see FIG. 1) determines whether the data stored at the predetermined address of the EEPROM 116 (see FIG. 1) conforms to the specific value. When it is determined by the processor unit 112 that the data stored at the predetermined address of the EEPROM 116 does not conform to the specific value, step D is performed, in which the processor unit 112 determines that a power reset event has occurred.

In sub-step S2, the processor unit 112 determines that a request for reset operation has occurred when it is determined in step S1 that the data stored at the predetermined address of the EEPROM 116 conforms to the specific value.

In sub-step S3, the processor unit 112 issues a clear command to clear the data stored at the predetermined address of the EEPROM 116.

It is evident from the above that, in the third embodiment, the processor unit 112 determines in sequence to first exclude the occurrence of a protocol error event in step B, to next exclude the occurrence of malfunction of the processor unit 112 in step C, and to finally exclude the occurrence of a request for reset operation in step S, so as to subsequently determine that the server 1 has undergone power reset, and to record the power reset event into the event log 113.

To sum up, the method of detecting power reset of a server according to the disclosure has the following advantages.

First, an advanced power supply is not required, and by merely the processor unit 112 of the baseboard management controller 1 which performs the aforementioned determinations, whether or not a power reset event has occurred may be thus recorded.

Second, when detection of power reset is performed, the processor unit 112 is able to exclude any one of the reset request event, the malfunction of the processor unit 112, and the protocol error event, so as to correctly determine that the server 1 has undergone power reset.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of determining whether power reset of a server due to power interruption has occurred, the server including a baseboard management controller which includes a random access memory and a processor unit coupled electrically to the random access memory, the random access memory storing a power reset flag, the method to be implemented by the baseboard management controller of the server and comprising the following steps:
   after receiving an event signal, by the processor unit, determining whether or not to initialize the random access memory based on the event signal thus received, and initializing the random access memory when it is determined to initialize the same;
   determining, by the processor unit, whether a protocol error event, which is associated with a protocol error in software stack structures for an operating system run by the processor unit, has occurred according to a flag value of the power reset flag stored in the random access memory;
   determining, by the processor unit, whether malfunction of the processor unit has occurred when it is determined that the protocol error event has not occurred; and
   determining, by the processor unit, that a power reset event associated with power reset of the server has occurred when it is determined that malfunction of the processor unit has not occurred.

2. The method as claimed in claim 1, the baseboard management controller further including a monitoring unit which is coupled electrically to the processor unit and monitors operations of the processor unit, and a protocol layer unit which is coupled electrically to the processor unit, wherein the step of determining whether or not to initialize the random access memory includes the sub-steps of:
   by the processor unit, rebooting the processor unit and initializing the random access memory when the processor unit receives one of an input power signal recovered from power interruption, and a processor malfunction signal issued from the monitoring unit and indicating malfunction of the processor unit, wherein the input power signal recovered from power interruption and the processor malfunction signal serves as the event signal;
   determining, by the processor unit, not to reboot the processor unit and not to initialize the random access memory when the processor unit receives a protocol error signal issued from the protocol layer unit, wherein the protocol error signal serves as the event signal.

3. The method as claimed in claim 2, wherein the step of determining whether the protocol error event has occurred includes sub-steps of:
   determining, by the processor unit, whether the flag value of the power reset flag conforms to a preset value;
   determining, by the processor unit, that the protocol error event has occurred in the protocol layer unit when it is determined that the flag value of the power reset flag conforms to the preset value; and
   writing, by the processor unit, the preset value to the power reset flag stored in the random access memory for updating the flag value of the power reset flag when it is determined that the flag value of the power reset flag does not conform to the preset value.

4. The method as claimed in claim 2, wherein the step of determining whether malfunction of the processor unit has occurred includes the sub-steps of:
   determining, by the processor unit, a logic level of a timeout flag of the monitoring unit; and
   determining, by the processor unit, that malfunction of the processor unit has occurred when it is determined that the timeout flag is at a first logic level; otherwise, the flow proceeding to the step of determining that the power reset event has occurred when it is determined that the timeout flag is at a second logic level.

5. The method as claimed in claim 2, the baseboard management controller further including an electronically erasable programmable read-only memory (EEPROM) which is coupled electrically to the processor unit, wherein the sub-step of rebooting the processor unit and initializing the random access memory further includes:
   writing, by the processor unit, a specific value into a predetermined address of the EEPROM prior to rebooting the processor unit and initializing the random access memory when the processor unit receives a reset request signal, wherein the reset request signal serves as the event signal.

6. The method as claimed in claim 5, prior to the step of determining whether a protocol error event has occurred, further comprising:
   determining, by the processor unit, whether data stored at the predetermined address of the EEPROM conforms to the specific value;
   determining, by the processor unit, that a request for reset operation has occurred when it is determined that the data stored at the predetermined address of the EEPROM conforms to the specific value; and
   issuing, by the processor unit, a clear command to clear the data stored at the predetermined address of the EEPROM.

7. The method as claimed in claim 5, subsequent to the sub-step of rebooting the processor unit and initializing the random access memory, and prior to the step of determining whether a protocol error event has occurred, further comprising:
   by the processor unit, obtaining data stored at the predetermined address of the EEPROM and writing the data thus obtained into a reset request flag stored in the random access memory; and
   issuing, by the processor unit, a clear command to clear the data stored at the predetermined address of the EEPROM;
   the method, subsequent to the step of determining whether malfunction of the processor unit has occurred, and prior to the step of determining that a power reset event has occurred, further comprising:
   determining, by the processor unit, whether a flag value of the reset request flag stored in the random access memory conforms to the specific value; and determining, by the processor unit, that a request for reset operation has occurred when it is determined that the flag value of the reset request flag conforms to the specific value;

otherwise, the flow proceeding to the step of determining that a power reset event has occurred when it is determined that the flag value of the reset request flag does not conform to the specific value.

8. The method as claimed in claim 5, subsequent to the step of determining whether malfunction of the processor unit has occurred, and prior to the step of determining that a power reset event has occurred, further comprising:

determining, by the processor unit, whether data stored at the predetermined address of the EEPROM conforms to the specific value;

determining, by the processor unit, that a request for reset operation has occurred when it is determined that the data stored at the predetermined address of the EEPROM conforms to the specific value; and issuing, by the processor unit, a clear command to clear the data stored at the predetermined address of the EEPROM.

9. A baseboard management controller comprising:

a random access memory storing a power reset flag; and a processor unit coupled electrically to said random access memory, said processor unit being programmed to after receiving an event signal, determine whether or not to initialize said random access memory based on the event signal thus received, and initialize said random access memory when it is determined to initialize the same, determine whether a protocol error event, which is associated with a protocol error in software stack structures for an operating system run by the processor unit, has occurred according to a flag value of the power reset flag stored in said random access memory, determine whether malfunction of said processor unit has occurred when it is determined that the protocol error event has not occurred, and determine that a power reset event which is associated with power reset of the server caused by power interruption has occurred when it is determined that malfunction of said processor unit has not occurred.

10. The baseboard management controller as claimed in claim 9, further comprising:

a monitoring unit which is coupled electrically to said processor unit and monitors operations of said processor unit; and a protocol layer unit which is coupled electrically to said processor unit;

wherein said processor unit is further programmed to reboot said processor unit and initialize said random access memory when said processor unit receives one of an input power signal recovered from power interruption, and a processor malfunction signal issued from said monitoring unit and indicating malfunction of said processor unit, the input power signal recovered from power interruption/the processor malfunction signal serving as the event signal, and determine not to reboot said processor unit and not to initialize said random access memory when said processor unit receives a protocol error signal issued from said protocol layer unit, the protocol error signal serving as the event signal.

11. The baseboard management controller as claimed in claim 10, wherein said processor unit is further programmed to:

determine whether the flag value of the power reset flag conforms to a preset value;

determine that the protocol error event has occurred in said protocol layer unit when it is determined that the flag value of the power reset flag conforms to the preset value; and write the preset value to the power reset flag stored in said random access memory for updating the flag value of the power reset flag when it is determined that the flag value of the power reset flag does not conform to the preset value.

12. The baseboard management controller as claimed in claim 10, wherein said processor unit is further programmed to:

determine a logic level of a timeout flag of said monitoring unit; and determine that malfunction of said processor unit has occurred when it is determined that the timeout flag is at a first logic level; otherwise, determine that the power reset event has occurred when it is determined that the timeout flag is at a second logic level.

13. The baseboard management controller as claimed in claim 10, further comprising:

an electronically erasable programmable read-only memory (EEPROM) which is coupled electrically to said processor unit; and wherein said processor unit is further programmed to write a specific value into a predetermined address of said EEPROM prior to rebooting said processor unit and initialize said random access memory when said processor unit receives a reset request signal, the reset request signal serving as the event signal, determine whether data stored at the predetermined address of said EEPROM conforms to the specific value, determine that a request for reset operation has occurred when it is determined that the data stored at the predetermined address of said EEPROM conforms to the specific value, and issue a clear command to clear the data stored at the predetermined address of said EEPROM.

14. The baseboard management controller as claimed in claim 10, further comprising:

an electronically erasable programmable read-only memory (EEPROM) which is coupled electrically to said processor unit; and wherein said processor unit is further programmed to write a specific value into a predetermined address of said EEPROM prior to rebooting said processor unit and initialize said random access memory when said processor unit receives a reset request signal, the reset request signal serving as the event signal, obtain data stored at the predetermined address of said EEPROM and write the data thus obtained into a reset request flag stored in said random access memory, issue a clear command to clear the data stored at the predetermined address of said EEPROM, determine whether a flag value of the reset request flag stored in said random access memory conforms to the specific value, and determine that a request for reset operation has occurred when it is determined that the flag value of the reset request flag conforms to the specific value;

otherwise, determine that a power reset event has occurred when it is determined that the flag value of the reset request flag does not conform to the specific value.

15. A server comprising:
an intelligent platform management interface (IPMI) which generates a reset request signal in response to receipt of a reset command; and
a baseboard management controller which includes
a random access memory storing a power reset flag,
a processor unit coupled electrically to said random access memory, and
an electronically erasable programmable read-only memory (EEPROM) coupled electrically to said processor unit;
wherein said processor unit is programmed to
after receiving an event signal, determine whether or not to initialize said random access memory based on the event signal thus received, and initialize said random access memory when it is determined to initialize the same,
determine whether data stored at a predetermined address of said EEPROM conforms to a specific value,
determine whether a protocol error event, which is associated with a protocol error in software stack structures for an operating system run by the processor unit, has occurred according to a flag value of the power reset flag stored in said random access memory when it is determined that the data stored at the predetermined address of said EEPROM does not conform to a specific value,
determine whether malfunction of said processor unit has occurred when it is determined that the protocol error event has not occurred, and
determine that a power reset event which is associated with power reset of the server caused by power interruption has occurred when it is determined that malfunction of said processor unit has not occurred.

16. The server as claimed in claim 15, wherein said baseboard management controller further including:
a monitoring unit which is coupled electrically to said processor unit and monitors operations of said processor unit; and
a protocol layer unit which is coupled electrically to said processor unit;
wherein said processor unit is further programmed to
reboot said processor unit and initialize said random access memory when said processor unit receives one of an input power signal recovered from power interruption, the reset request signal, and a processor malfunction signal issued from said monitoring unit and indicating malfunction of said processor unit, the input power signal recovered from power interruption, the reset request signal, or the processor malfunction signal serving as the event signal, and
determine not to reboot said processor unit and not to initialize said random access memory when said processor unit receives a protocol error signal issued from said protocol layer unit, the protocol error signal serving as the event signal.

17. The server as claimed in claim 16, wherein said processor unit is further programmed to:
determine whether the flag value of the power reset flag conforms to a preset value;
determine that the protocol error event has occurred in said protocol layer unit when it is determined that the flag value of the power reset flag conforms to the preset value; and
write the preset value to the power reset flag stored in said random access memory for updating the flag value of the power reset flag when it is determined that the flag value of the power reset flag does not conform to the preset value.

18. The server as claimed in claim 16, wherein said processor unit is further programmed to:
determine a logic level of a timeout flag of said monitoring unit which indicates malfunction of said processor unit; and
determine that malfunction of said processor unit has occurred when it is determined that the timeout flag is at a first logic level, otherwise, determine that the power reset event has occurred when it is determined that the timeout flag is at a second logic level.

19. The server as claimed in claim 16, wherein said processor unit is further programmed to:
write the specific value into the predetermined address of said EEPROM prior to rebooting said processor unit and initializing said random access memory when said processor unit receives the reset request signal;
determine that a request for reset operation has occurred when it is determined that the data stored at the predetermined address of said EEPROM conforms to the specific value; and
issue a clear command to clear the data stored at the predetermined address of said EEPROM.

20. The server as claimed in claim 16, wherein said processor unit is further programmed to:
write the specific value into the predetermined address of said EEPROM prior to rebooting said processor unit and initializing said random access memory when said processor unit receives the reset request signal;
obtain data stored at the predetermined address of said EEPROM and write the data thus obtained into a reset request flag stored in said random access memory;
issue a clear command to clear the data stored at the predetermined address of said EEPROM;
determine whether a flag value of the reset request flag stored in said random access memory conforms to the specific value, and
determine that a request for reset operation has occurred when it is determined that the flag value of the reset request flag conforms to the specific value; otherwise, determine that a power reset event has occurred when it is determined that the flag value of the reset request flag does not conform to the specific value.

* * * * *